(12) United States Patent
McCosh et al.

(10) Patent No.: US 8,714,510 B2
(45) Date of Patent: May 6, 2014

(54) ELECTRONIC DEVICE HOLDER AND STAND

(75) Inventors: Benjamin McCosh, Cotati, CA (US); Mark Loncar, San Francisco, CA (US)

(73) Assignee: DayMen Canada Acquisition ULC, Vancouver, BC (CA)

( * ) Notice: Subject to any disclaimer, the term of this patent is extended or adjusted under 35 U.S.C. 154(b) by 198 days.

(21) Appl. No.: 13/441,976

(22) Filed: Apr. 9, 2012

(65) Prior Publication Data

US 2013/0264459 A1 Oct. 10, 2013

(51) Int. Cl.
*A47B 97/04* (2006.01)

(52) U.S. Cl.
USPC .......... 248/460; 248/450; 248/457; 248/459; 206/45.23; 40/777

(58) Field of Classification Search
USPC ............. 248/441.1, 447, 450, 454, 457, 459, 248/460, 463, 174, 300, 444, 455; 206/45.23, 307, 307.1, 308.3, 312, 206/710, 711; 40/752, 754, 777
See application file for complete search history.

(56) References Cited

U.S. PATENT DOCUMENTS

| | | | |
|---|---|---|---|
| 396,508 A | | 1/1889 | Pearson |
| 876,062 A | | 1/1908 | Keiser |
| 1,639,787 A | * | 8/1927 | Tinsley ............................ 248/174 |
| 1,875,460 A | * | 9/1932 | Holy ............................ 248/450 |
| 2,165,255 A | * | 7/1939 | Hamilton ...................... 248/455 |
| 2,383,776 A | * | 8/1945 | Cross ............................... 40/753 |
| 2,783,013 A | * | 2/1957 | Williamson .................. 248/450 |
| 3,058,401 A | * | 10/1962 | Cross ............................ 493/356 |
| 3,097,444 A | * | 7/1963 | Steiner ........................... 248/454 |
| 4,377,271 A | * | 3/1983 | Smith ............................ 248/460 |
| 5,253,840 A | * | 10/1993 | Sheremetta .................... 248/452 |
| 6,523,858 B2 | * | 2/2003 | Takemura ....................... 281/29 |
| 6,648,139 B2 | | 11/2003 | Fisher, Jr. et al. |
| 6,772,879 B1 | | 8/2004 | Domotor |
| 6,892,880 B2 | | 5/2005 | Nieves |
| 7,540,378 B2 | | 6/2009 | Gallagher |
| 7,584,841 B2 | * | 9/2009 | Chan et al. ................. 206/45.23 |
| 7,735,644 B2 | | 6/2010 | Sirichai et al. |
| 8,336,242 B2 | * | 12/2012 | Useche ........................... 40/777 |
| 8,424,829 B2 | * | 4/2013 | Lu et al. ......................... 248/371 |
| 2003/0214779 A1 | | 11/2003 | Socolofsky |
| 2004/0173482 A1 | | 9/2004 | Nieves |

(Continued)

OTHER PUBLICATIONS

"Sony eBook Reader Touch (PRS-600) Cover—Black", http://www.whsmith.co.uk/CatalogAndSearch/ProductDetails-Sony+eBook+Reader+Touch+Cover++Black-34170977.html, (Publication Date Unknown).

(Continued)

*Primary Examiner* — Terrell McKinnon
*Assistant Examiner* — Michael McDuffie
(74) *Attorney, Agent, or Firm* — Medler Ferro PLLC

(57) ABSTRACT

A case for an electronic device such as a tablet computer includes book configuration and stand configuration. In the stand configuration, the back panel of the holder, against which the electronic device is held, is disposed at an incline with respect to the front panel. The stand configuration is achieved through folding seams in the front panel and pockets in the back panel such that the front panel is folded back such that the front panel exterior surface generally faces the back panel exterior surface and respective front panel corners are folded along the folding seams and disposed within the back panel pockets.

3 Claims, 7 Drawing Sheets

(56) References Cited

U.S. PATENT DOCUMENTS

| | | | |
|---|---|---|---|
| 2006/0289611 A1* | 12/2006 | Yeh | 229/67.1 |
| 2007/0114783 A1 | 5/2007 | Glosh et al. | |
| 2007/0278128 A1 | 12/2007 | Slaton | |
| 2008/0083631 A1 | 4/2008 | Tsang et al. | |
| 2008/0196804 A1 | 8/2008 | Hsu | |
| 2009/0045091 A1 | 2/2009 | O'Neill et al. | |
| 2009/0159763 A1* | 6/2009 | Kim | 248/174 |
| 2009/0314661 A1* | 12/2009 | Fisher et al. | 206/45.21 |
| 2011/0204758 A1 | 8/2011 | Loncar et al. | |
| 2012/0305413 A1* | 12/2012 | Chung | 206/45.23 |

OTHER PUBLICATIONS

"M-Edge Executive Jacket™ for the Amazon Kindle", http://www.buymedge.com/images/brochures/ME_2008 Kindle_Brochure.pdf, (Winter 2008).

"Amazon Kindle Leather Cover (Fits 6" Display, Latest Generation Kindle)", http://www.amazon.com/Amazon-Kindle-Leather-Cover-Generation/dp/B001JAH7OM/ref=pd_sim_e_16, (Publication Date unknown).

"Sony E-Reader Silicone Cover", http://www.play.com/Electronics/Electronics/4-/6847048/Sony-E-Reader-Silicone-Cover/Product.html#, (Publication Date Unknown).

"Morph your iPad with the modulR case system", *Gadgeteer*, (Mar. 11, 2010).

Hutchinson, Roland "ModulR iPad Case", http://www.geeky-gadgets.com/modulr-ipad-case-11-03-2010/, (Mar. 11, 2010).

Roberto "modulR Unveils Product Lineup and Pricing", http://www.padgadget.com/2010/06/02/modulr-unveils-product-lineup-and-pricing/, (Jun. 2, 2010).

"modulR unveils product lineup and pricing", *modulR press release*, (Jun. 2, 2010).

"Say hello to modulR, a new case and line of accessories for the Apple iPad", *modulR press release*, (Mar. 10, 2010).

"Quirky Cloak", http://www.quirky.com/products/30-Cloak, (Preliminary Engineering completed Mar. 30, 2010).

* cited by examiner

ELECTRONIC DEVICE HOLDER AND STAND

FIELD OF THE INVENTION

The invention is related to a holder and stand for an electronic device such as a tablet computer.

BACKGROUND OF THE INVENTION

Portable or handheld electronic devices, such as eReader devices, personal digital assistants, cellular telephones, tablet computers and the like, have internal circuitry, delicate components, and screens that are prone to damage. Thus, there are holders or covers for such devices that protect such devices from the environment. There is often a desire to stand these electronic devices at an incline or angle towards the user when watching video programming, viewing still images, or typing on a touch-screen keypad/keyboard that appears on the device screen. In order to protect their device and serve all viewing preferences, users often purchase protective holders with viewing stands.

There are a variety of conventional hard-shell and soft-shell holders available for mobile phones, PDAs and portable video/music players, and table computers, but these have rather limited functionality. Although they generally succeed in protecting the portable electronic device, they can detract from its portability, usability and/or aesthetic appearance, and fall short of the needs of the user in many other ways. Moreover, the stand mechanisms currently in use generally are awkward, bulky, or ineffective.

BRIEF SUMMARY OF THE INVENTION

Embodiments hereof relate to cases or holders for portable devices. In particular, embodiments hereof relate to a holder for an electronic device, wherein the holder includes a first or book configuration and a second or stand configuration. In the stand configuration, the back panel of the holder, against which the electronic device is held, is disposed at an incline with respect to the front panel. The stand configuration is achieved through folding seams in the front panel and pockets in the back panel.

BRIEF DESCRIPTION OF DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Figure 1:
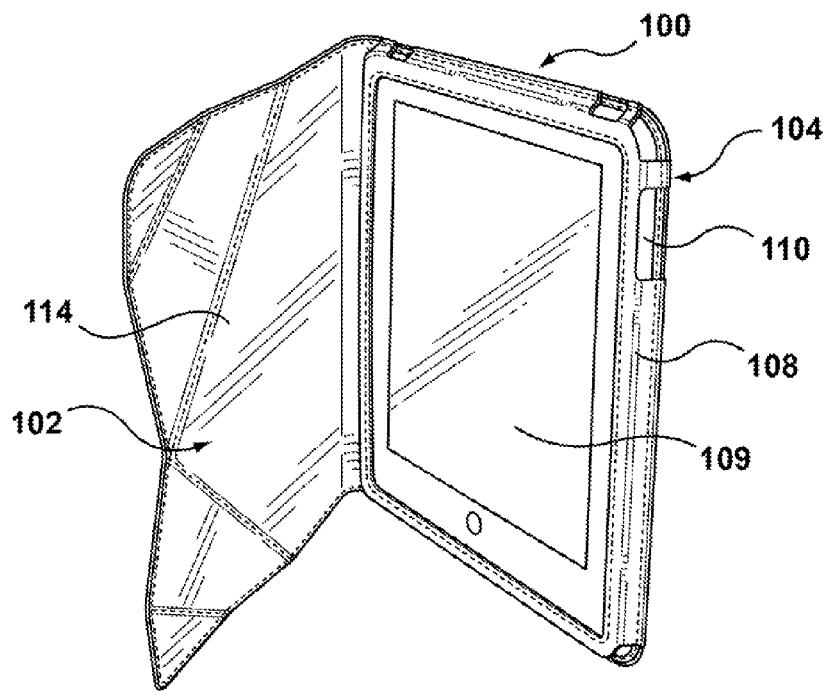
FIG. 1 is an illustration of an electronic device holder according to an embodiment hereof.

Specific embodiments of the present invention are now described with reference to the figures, wherein like reference numbers indicate identical or functionally similar elements. The following detailed description is merely exemplary in nature and is not intended to limit the invention or the application and uses of the invention. Although the description of the invention is in the context of securing electronic devices, the invention may also be used to secure other devices as it is deemed useful. Furthermore, there is no intention to be bound by any expressed or implied theory presented in the preceding technical field, background, brief summary or the following detailed description.

Embodiments hereof relate to an electronic device holder 100 for protecting and viewing an electronic device 109. Holder 100 may be formed from a relatively hard or rigid material that operates to protect the electronic device from breakage or damage. In the embodiment depicted in FIGS. 1-7, holder 100 includes a first or front panel 102 connected to a second or back panel 104 via a spine 106 in the manner of a book. Back panel 104 includes a border 108 that extends from edges of back panel 104 and is spaced from an inside surface 116 of back panel 104 such that border 108 creates as space for electronic device 109 and holds electronic device 109 in holder 100. In the embodiment shown, border 108 is generally continuous around three sides of back panel 104, with openings 110 strategically located through border 108 for access to edges of electronic device 109. For example, and not by way of limitation, openings 110 may provide access to power ports, USB ports, power switches, and other similar items generally found along edges of electronic devices. Border 108 further includes an opening 111 running adjacent and parallel to spine 106 for a user to be able to insert and remove electronic device 109 from border 108. Further, rather than being generally continuous with openings 110, border 108 may be more sporadically located to the point of being located only at the corners of back panel 104 to hold electronic device 109. Border 108 and holder 100 are generally sized to hold particular sizes of electronic devices. For example, and not by way of limitation, holder 100 and corresponding border 108 may be sized to receive an eBook reader such as the Kindle™, or tablet computers, such as the iPad™ from Apple Inc. or other similar devices. Holder 100 and border 108 may also be sized to hold other electronic devices such as a mobile phone, a personal digital assistant (PDA), an MP3 player, or other handheld portable electronic device.

Figure 2:
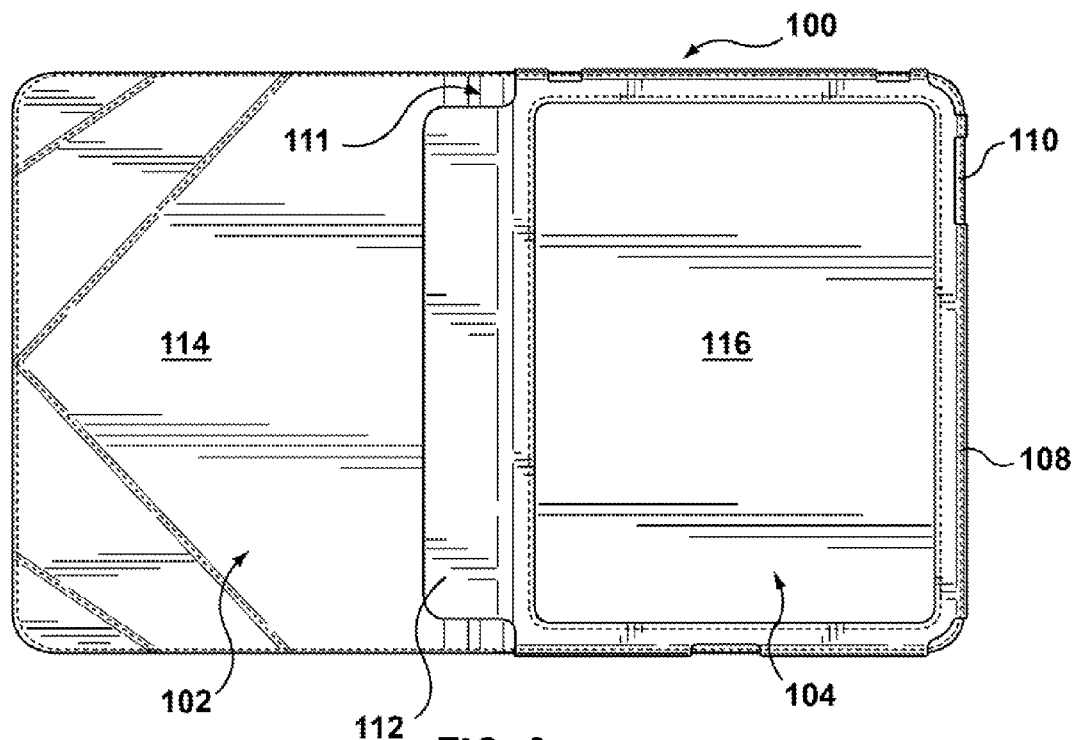
FIG. 2 is a laid open view of the electronic device holder of FIG. 1 such that the inside surfaces of the holder are visible.
Figure 3:
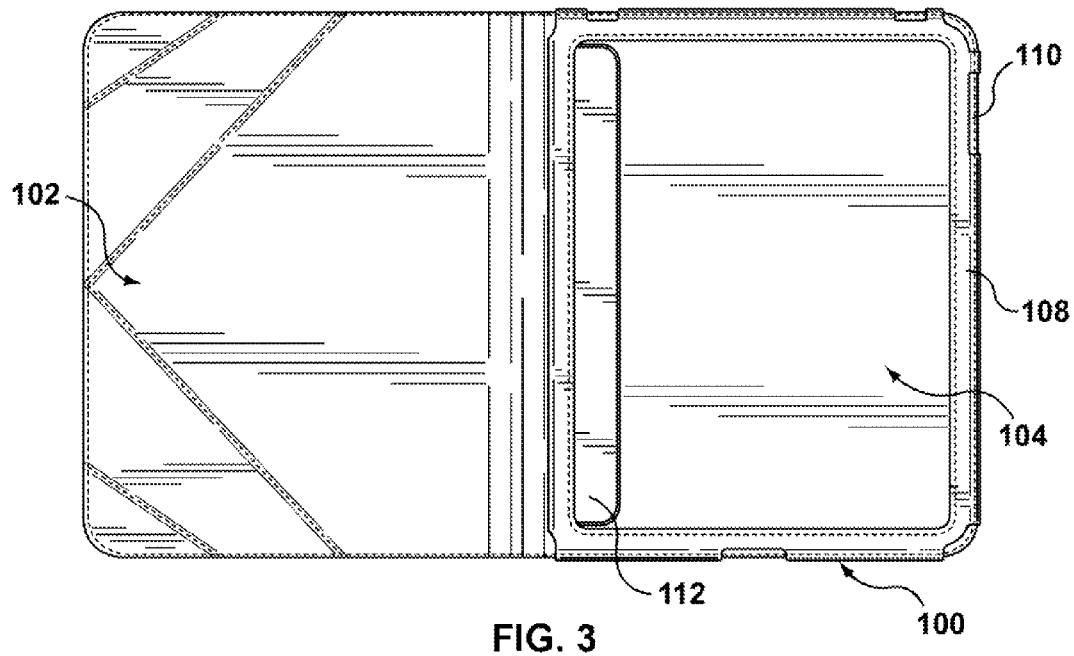
FIG. 3 is the view of FIG. 2 with a flap of the border to hold the electronic device tucked within the border.

Border 108 may further include a flap 112 along opening 111 to further secure electronic device 109 within border 108. As seen in FIG. 2, flap 112 may be extended towards front panel 102 to provide access to opening 111 such that electronic device 109 may be inserted into border 108. After electronic device 109 has been inserted into border 108, flap 112 may be extended over the left edge of electronic device 109 and tucked behind electronic device 109, as shown in FIG. 3. FIG. 3 shows flap 112 in the position it would be with electronic device 109 secured within border 108, but does not show electronic device 109 for clarity.

Front panel 102, back panel 104, and spine 106 may be formed from any relatively hard or stiff protective material including but not limited to cardboard, bamboo, fiberboard, wood, wood fiber, metal, polymer, synthetic textiles, nylon, polyurethane, wool, polyester, and other suitable materials as would be known to those skilled in the art. In one embodiment, outer surfaces 118, 120 of front and back panels 102, 104, respectively, may include a covering for aesthetic purposes. The covering may be canvas, cloth, synthetic leather, leather, or tarpaulin. Further, in one embodiment, inner surfaces 114, 116 of front and back panels 102, 104, respectively, may include an inner lining of a soft, non-scratch microfiber material and/or a thin padding of approximately 2-3 mm thickness between the lining and the hard protective material of front panel 104 to protect the electronic device when electronic device holder 100 is closed.

Figure 5:
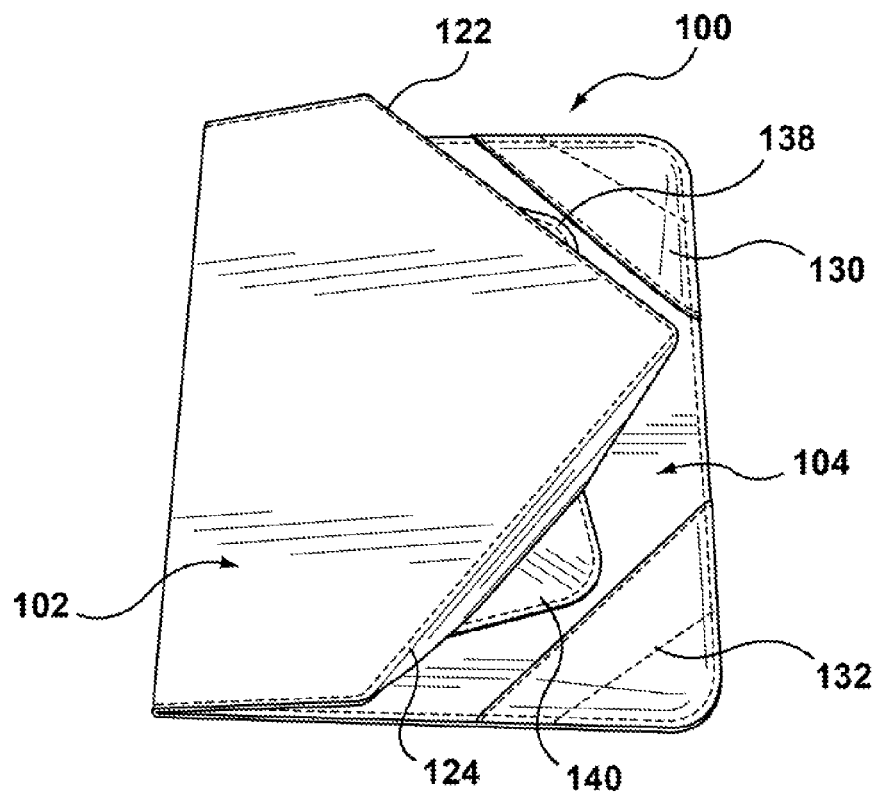
FIG. 5 is an illustration of the holder of FIG. 1 with portions of the front panel bent back and folded in the process of creating a stand for the holder.
Figure 6:
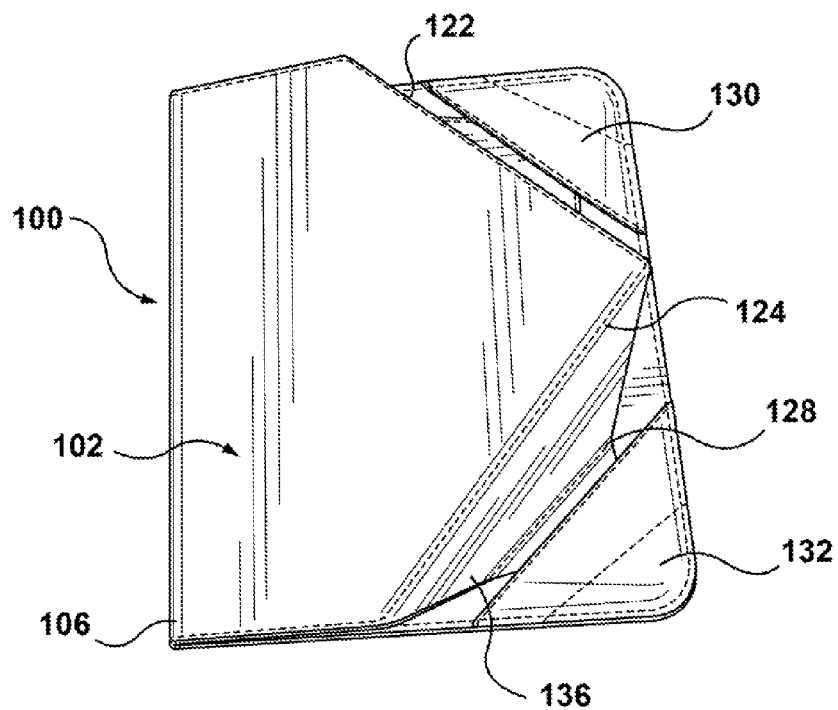
FIG. 6 is an illustration of the holder of FIG. 1 with corners of the front panel inserted into pockets of the back panel to create a stand for the holder.
Figure 7:
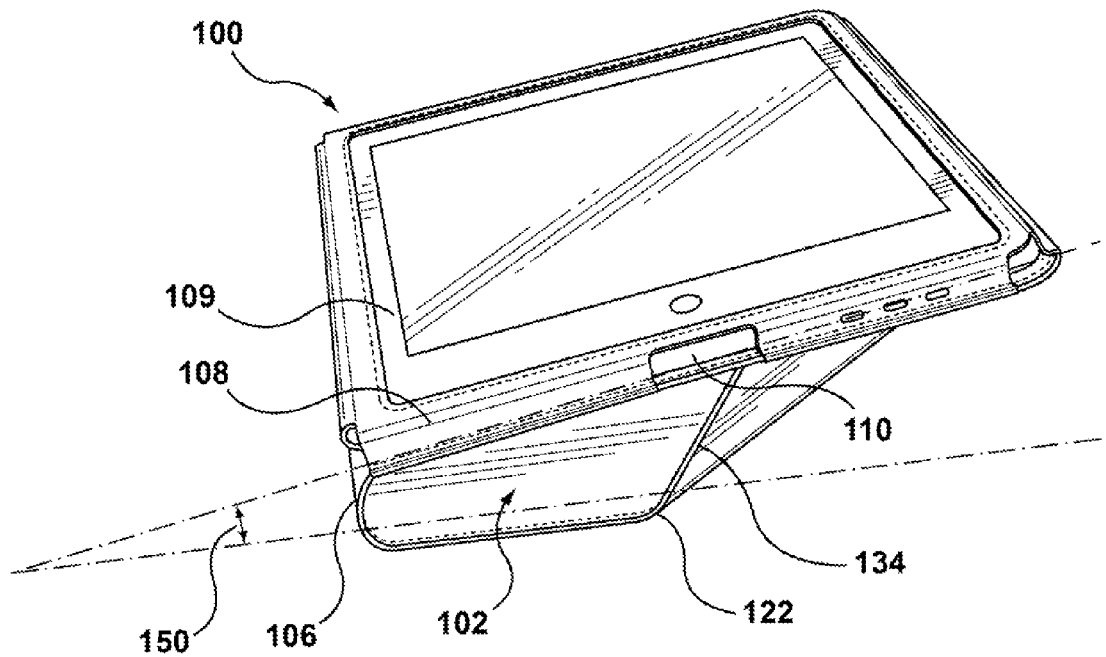
FIG. 7 is a perspective view of the holder of FIG. 1 with the stand deployed such that the electronic device is inclined relative to the user.

FIGS. 4-7 show electronic device holder 100 as it is converted from a first configuration for holding the electronic device in a book configuration to a second configuration for displaying the electronic device in a landscape configuration. In the second configuration, the electronic device 109 as inclined toward the user for convenient viewing of the electronic device screen, and/or interacting with the device via the device's touch-screen, such as typing on a touch-screen keyboard that appears on the device screen. In particular, the electronic device is inclined toward the user by having front panel 102 and back panel 104 extending in the same general direction relative to spine 106, but having front panel 102 and back panel 104 disposed at an angle 150 relative to each other, as shown in FIG. 7. Angle 150 may be between 9° and 19°, preferably between 12° and 16°, but may also be other angles depending on the intended use of the device. Further, front panel 102 acts as a stand to support back panel 104 at the angle 150 relative to the front panel 102, as will be explained in more detail.

Figure 4:
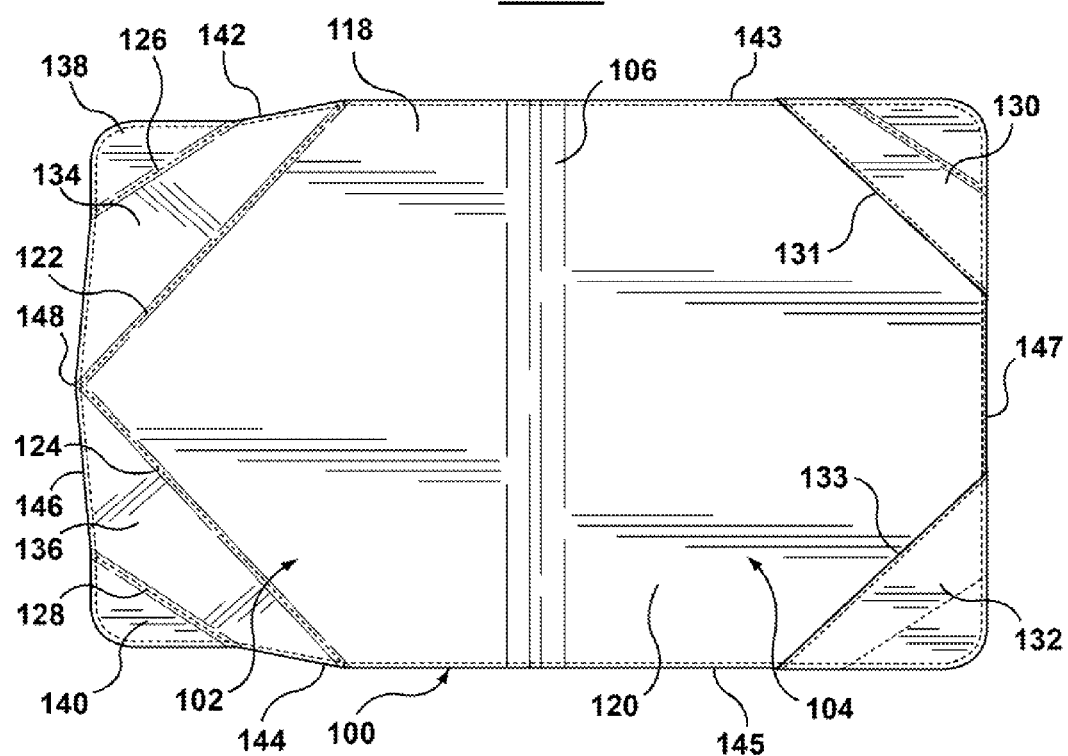
FIG. 4 is a back view of the holder of FIG. 1.

As shown in FIG. 4, exterior surface 118 of front panel 102 includes first folding seams or lines 122, 124 disposed diagonally across front panel 102. In particular, first folding seam 122 runs from a top edge 142 of front panel 102 to an outer edge 146 of front panel 102 opposite spine 106 and first folding seam 124 runs from a bottom edge 144 of front panel 102 to outer edge 146. In the embodiment shown in FIG. 4, first folding seams 122, 124 meet at a point 148 on outer edge 146. Front panel 102 also includes second folding lines or seams 126, 128 disposed diagonally across front panel 102. Similar to first folding seams 122, 124, second folding seam 126 runs from top edge 142 to outer edge 146 and second folding seam 128 runs from bottom edge 144 to outer edge 146. Second folding seams 126, 128 are similar to first folding seams 122, 124 except that second folding seams 126, 128 are disposed closer to corners 138, 140 of front panel 102 than first folding seams 122, 124. A first stand leg 134 is formed by the portion of front panel 102 between first folding seam 122 and second folding seam 126 and a second stand leg 136 is formed by the portion of front panel 102 between first folding seam 134 and second folding seam 128. Corners 138, 140 are formed by the portions of front panel 102 distal of second folding seams 126, 128 relative to spine 106. First folding seams 122, 124 and second folding seams 126, 128 may be formed by any manner known to those of ordinary skill in the art. For example, and not by way of limitation, the material that provides stiffness to front panel 102, such as fiberboard, may be divided into five pieces, generally conforming to the shape of corners 138, 140, stand legs 134, 136, and the remaining portion of front panel 102. The materials forming exterior surface 118 and interior surface 114 of front panel 102 are stitched to each other in the areas between these five pieces of fiberboard or other material such that the first and second folding seams 122, 124, 126, 128 do not include the relatively stiff material, such as fiberboard. These stitched folding seams also create pockets between the material forming exterior surface 118 and the material forming interior surface 114, wherein the relatively stiffer material disposed, as would be understood by those skilled in the art. Other ways to form first and second folding seams 122, 124, 126, 128 may also be used.

Figure 4A:
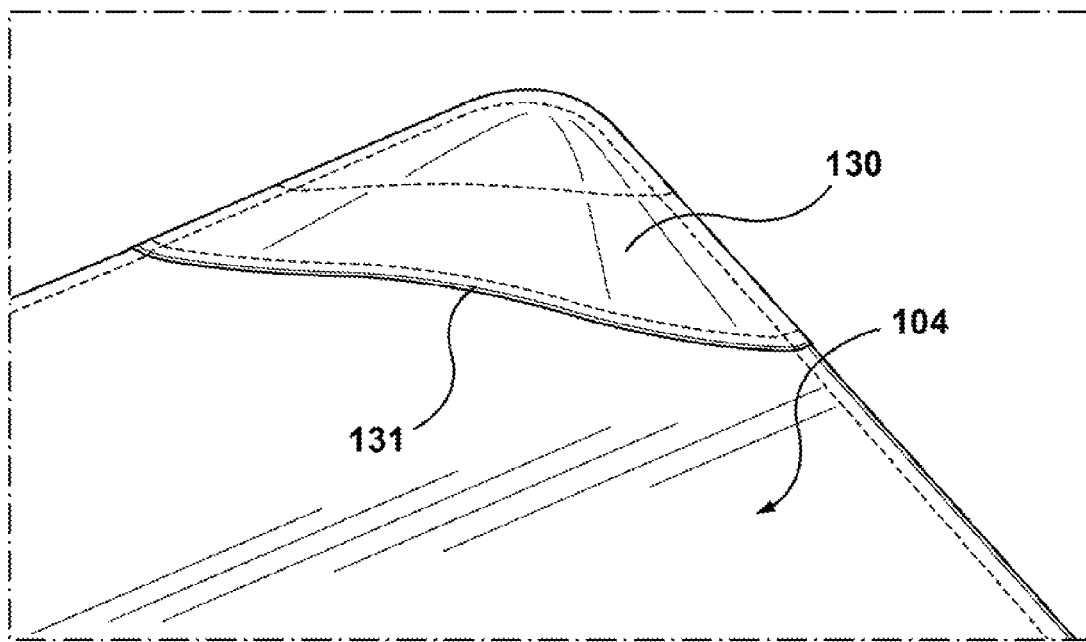
FIG. 4A is a close-up view of one of the corners of the back panel from FIG. 4.

As also shown in FIG. 4, back panel 104 includes an exterior surface 120 including pockets 130, 132 disposed at corners of back panel 104. In the embodiment shown, pockets 130, 132 are disposed generally diagonally across back panel 104. In particular, pocket 130 extends from a top edge 143 of back panel 104 to an outer edge 147 of back panel 104 opposite spine 106. Similarly, pocket 132 extends from a bottom edge 145 of back panel 104 to outer edge 147. Pockets 130, 132 are sized and shaped such as to receive corners 138, 140 of front panel 102, as explained in more detail below. Pockets 130, 132 may be formed by adding a second layer of the material used to form exterior surface 120 of back panel 104 to a first layer of the material used to form exterior surface. The second layer of material may be stitched or otherwise attached to the edges of back panel 104, while the diagonal portion of the second layer of material is not stitched to the first layer, thereby forming openings 131, 133, as shown in FIGS. 4 and 4A. Other ways of forming pockets 130, 132 may also be used. For example, and not by way of limitation, a single layer of the material to form exterior surface 120 of back panel 104 may be used with diagonal slits cut into the material to accommodate corners 138, 140 of front panel 102. Such an arrangement would be functional, but may not be as aesthetically pleasing or durable as adding a second layer of material. Other ways of forming pockets 130, 132 may also be used, as would be apparent to those skilled in the art.

In order to convert electronic device holder 100 from the first or book configuration to the second or stand configuration, front panel 102 is bent backwards towards back panel 104 such that the exterior surface 118 of front panel 102 faces the exterior surface 120 of back panel 104. Further, front panel 102 is folded at first folding seams 122, 124 such that the exterior surfaces of stand legs 134, 136 face generally in the direction of spine 106, as shown in FIG. 5. Front panel 102 is also folded at second folding seams 126, 128 such that corners 138, 140 are aligned with pockets 130, 132, respectively, as shown in FIG. 5. Corners 138, 140 are then slid or translated into pockets 130, 132, respectively, causing stand legs 134, 136 to incline slightly away from spine 106, as shown in FIG. 6. Electronic device holder 100 is now in the second or stand configuration.

Figure 8:
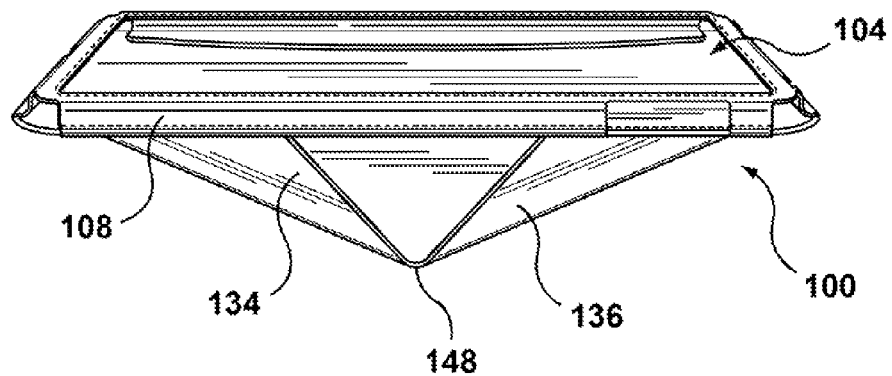
FIG. 8 is a view of from the outer edges of the front panel and back panel with the holder of FIG. 1 in the stand configuration.
Figure 9:
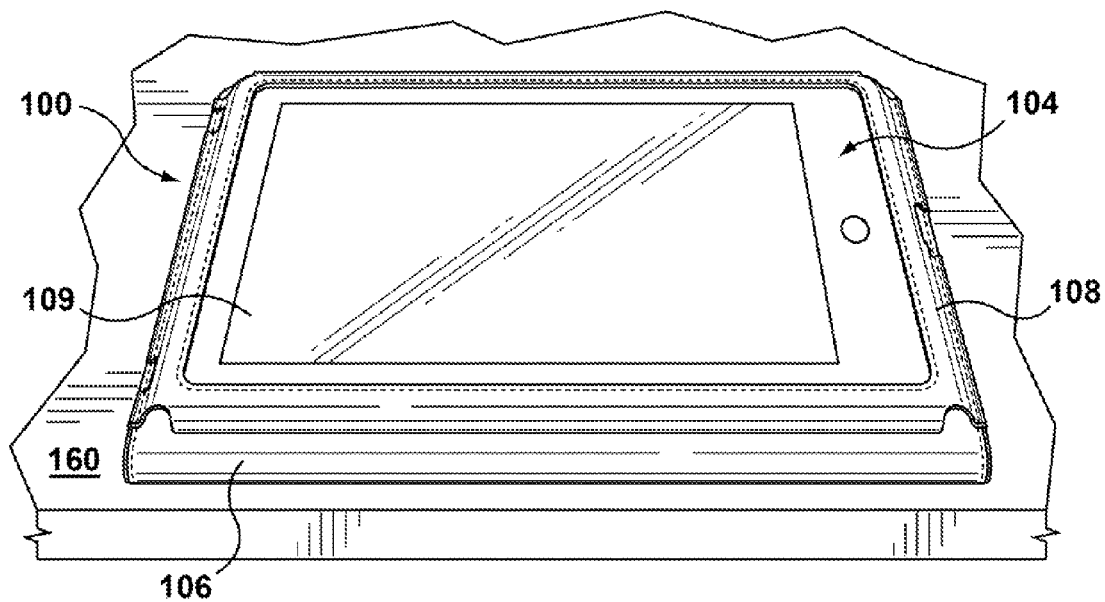
FIG. 9 is a view from the spine of the holder of FIG. 1 with the holder in the stand configuration.

In the stand configuration, holder 100 can be placed in a first stand configuration or a second stand configuration. In the first stand configuration, interior surface 114 of front panel is placed on a surface 160, such as a table, desk, airplane tray, user's lap, etc., with spine 106 facing the user, and the electronic device 109 in the holder 108 of back panel 104 is inclined toward the user at an angle 150 relative to the surface 160. Various views of holder 100 in the first stand configuration are shown in FIGS. 7-9. The first stand configuration is convenient for utilizing the touch-screen of the electronic device such as typing on a touch-screen keyboard or viewing the screen of the electronic device.

Figure 10:
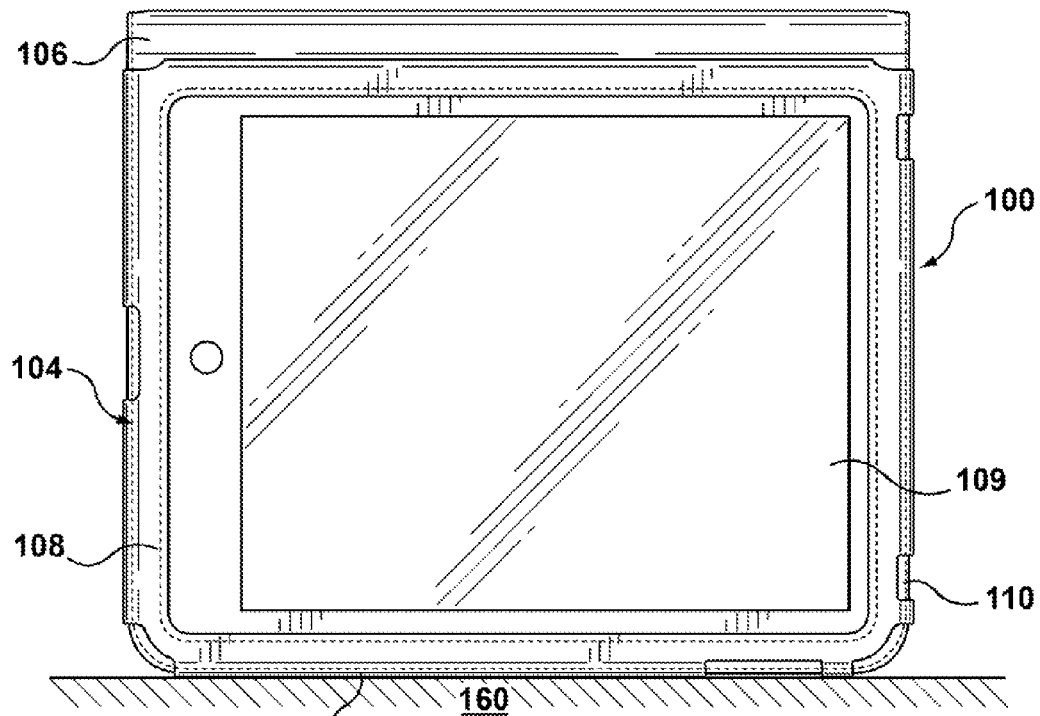
FIG. 10 is a view of the holder of FIG. 1 with the holder in the stand configuration and oriented with the outer edges of the front and back panels against a surface.
Figure 11:
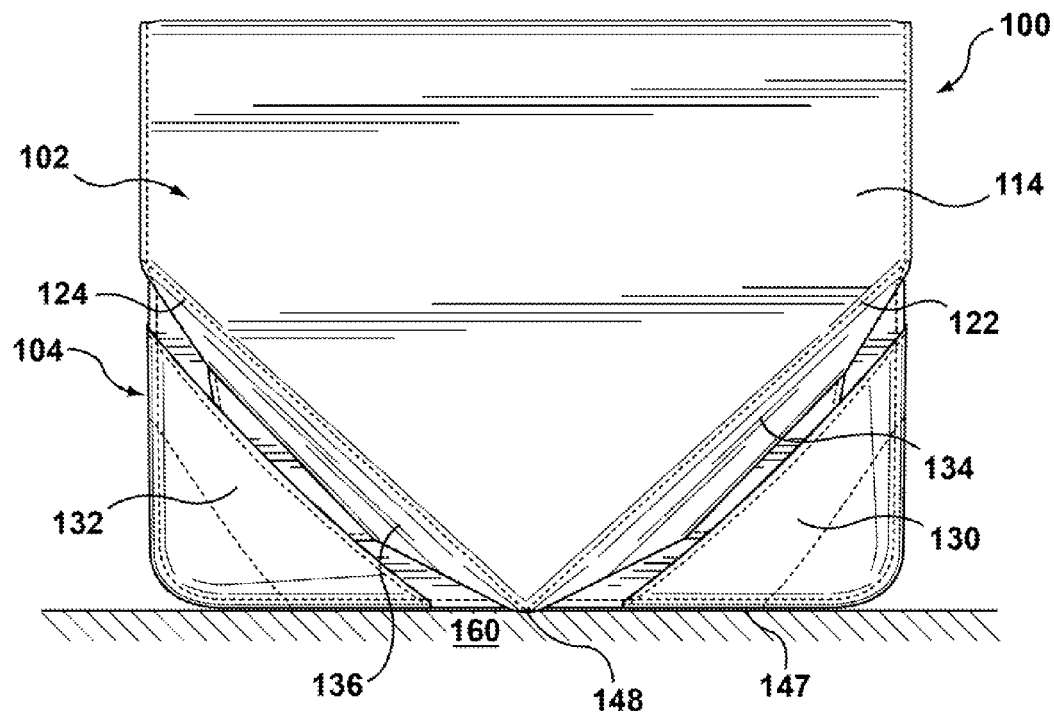
FIG. 11 is a back view of the holder of FIG. 1 in the configuration of FIG. 10.
Figure 12:
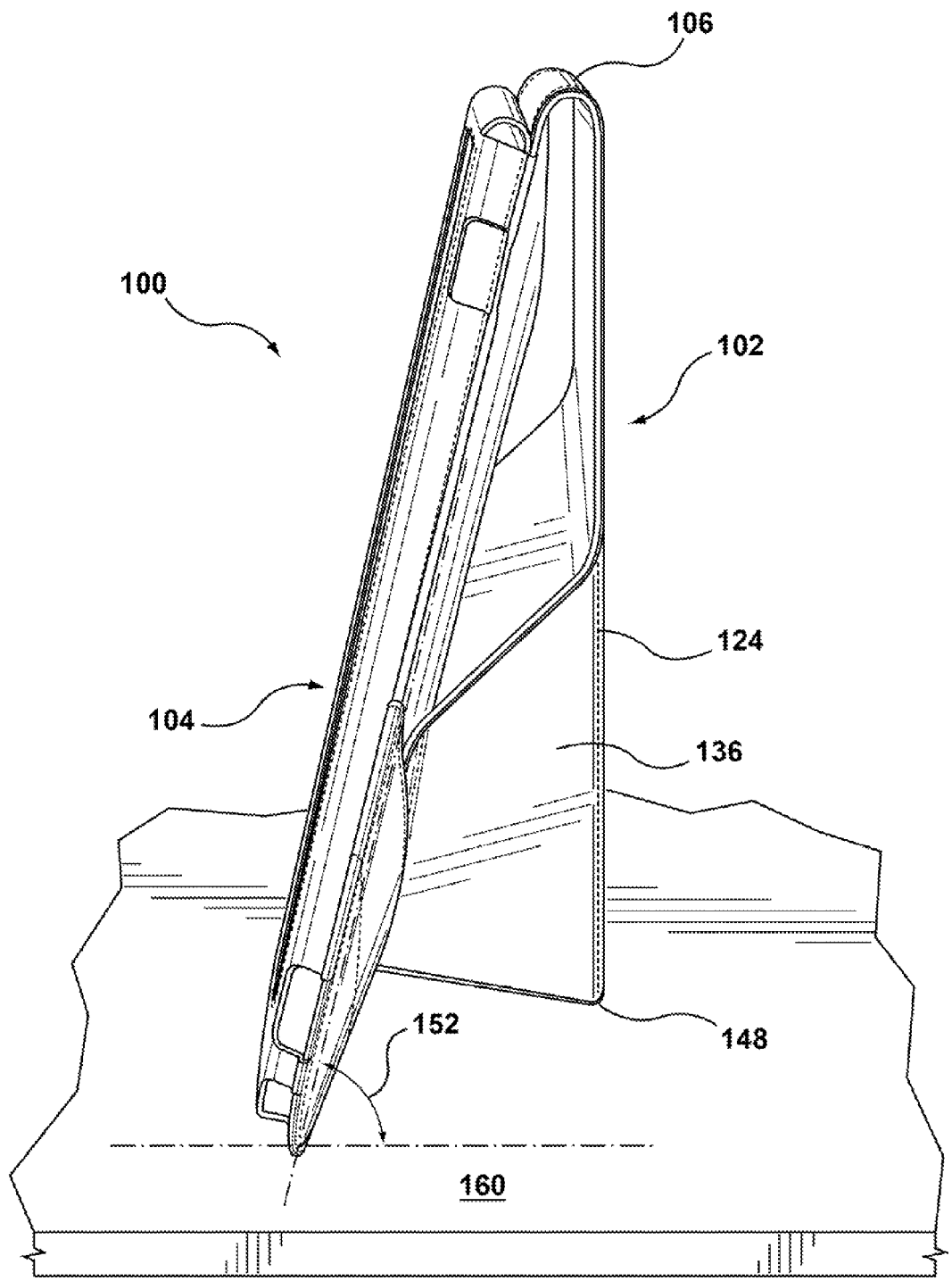
FIG. 12 is a side view of the holder of FIG. 1 in the configuration of FIG. 10.

In the second stand configuration, the back panel outer edge 147 and the front panel outer edge 146 are placed on surface 160, as shown in FIGS. 10-12. In particular, the point 148 of the front surface outer edge 146 is placed against the surface 160. In this second stand configuration, the electronic device is inclined toward the user at an angle 152. In particular, angle 152 is generally 90° minus angle 150. As can be seen, the holder 100 is in the second or stand configuration for both the first stand configuration and the second stand configuration. However, how the holder 100 is placed on the surface 160 is different.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. An electronic device holder comprising:
   a front panel including a front panel exterior surface and a front panel interior surface;
   a back panel including a back panel exterior surface and a back panel interior surface; and
   a spine connecting the front panel to the back panel,
   wherein the front panel includes a front panel top edge, a front panel bottom edge, and a front panel outer edge disposed opposite the spine, the front panel further including a pair of first folding seams extending respectively from the front panel top edge to the front panel outer edge and the front panel bottom edge to the front panel outer edge and a pair of second folding seams extending respectively from the front panel top edge to the front panel outer edge and the front panel bottom edge to the front panel outer edge, wherein each second folding seam is disposed closer to a respective front panel corner than the respective first folding seam,
   wherein the back panel exterior surface includes a pair of pockets disposed in respective back panel corners opposite the spine, and
   wherein the electronic device holder includes a first configuration wherein the electronic device holder is in the form of a book cover such that an electronic device is held against the back panel interior surface and the front panel interior surface may be opened and closed against the electronic device and a second configuration wherein the front panel is folded back such that the front panel exterior surface generally faces the back panel exterior surface and respective front panel corners disposed within the back panel pockets.

2. The electronic device holder of claim 1, wherein the front panel further includes a pair of stand legs defined by portions of the front panel disposed between each first folding seam and second folding seam, wherein in the second configuration, the front panel is folded at each of the first folding seams such that the exterior surface of the front panel at the stand legs faces towards the spine, and wherein in the second configuration the front panel is folded at each of the second folding seams such that the exterior surface of the front panel at the front panel corners abuts the back panel exterior surface.

3. The electronic device holder of claim 1, wherein in the second configuration, the back panel is disposed at an angle with respect to the front panel, the angle being between 9° and 19°.

* * * * *